United States Patent [19]
van der Lely

[11] 4,314,436
[45] Feb. 9, 1982

[54] MOWING MACHINE

[76] Inventor: Cornelis van der Lely, 7, Brüschenrain, Zug, Switzerland

[21] Appl. No.: 157,381

[22] Filed: Jun. 9, 1980

Related U.S. Application Data

[63] Continuation of Ser. No. 941,321, Sep. 11, 1978, Pat. No. 4,233,805.

[30] Foreign Application Priority Data

Sep. 19, 1977 [NL] Netherlands ............... 77.10240

[51] Int. Cl.³ .................................... A01D 55/262
[52] U.S. Cl. ................................. 56/13.6; 56/6
[58] Field of Search ............... 56/6, 13.6, 192, 295

[56] References Cited

U.S. PATENT DOCUMENTS

| | | | |
|---|---|---|---|
| 3,391,522 | 7/1968 | Zw eegers | 56/6 |
| 3,550,360 | 12/1970 | van der Lely | 56/6 |
| 3,604,185 | 9/1971 | Reber et al. | 56/6 |
| 3,751,889 | 8/1973 | Overesol | 56/6 |
| 3,783,533 | 1/1974 | Konig et al. | 56/6 |
| 3,835,630 | 9/1974 | Au | 56/295 |
| 3,931,859 | 1/1976 | van der Lely | 56/13.6 |
| 4,099,369 | 8/1978 | Oosterling et al. | 56/295 |
| 4,233,805 | 11/1980 | van der Lely | 56/192 |

FOREIGN PATENT DOCUMENTS 3475 4/1963 Japan ................... 56/13.6

Primary Examiner—Paul J. Hirsch
Attorney, Agent, or Firm—Penrose Lucas Albright

[57] ABSTRACT

A mowing machine connectable by its frame to a three-point lift device of a tractor and powered by the power take-off of the tractor via belts and a gear train, to extend laterally relative to one side of the tractor. An outboard portion of the frame forms a housing for a gear train that rotates crop displacing members thereunder about shafts each having a gear supported at the lower end thereof which engages pinions on parallel offset shafts for mowing elements. Supporting members under each mowing element are offset to the rear to support the machine. A screening member extends above the mowing elements and to the rear where it is bent downwardly to be spaced a distance less than the height of the mowing element above the ground. Forward the screening member is crenated as seen from above so cutters pivotly mounted from each mowing element describe a cutting arc of about 60° parallel to the adjacent arcuate portion of the screening member. Crop displacing members each consist of four sets of spring steel tines extending outwardly from a shaft supporting such members from rotor members welded to the shaft and spaced 90° from each other. The lower tines are bent downwardly to the vicinity of the cutters. Shaped covers on the screening member cover the lower gear and pinions. A pair of swath forming members each comprising a frame and resilient tines connected at either side of the screening member and outboard frame portion may be selectively secured in a plurality of angular settings to the rearward from the screening member.

6 Claims, 6 Drawing Figures

MOWING MACHINE

This is a continuation of application Ser. No. 941,321 filed Sept. 11, 1978, now U.S. Pat. No. 4,233,805.

RELATED APPLICATION

SUMMARY OF THE INVENTION

This invention relates to a mowing machine.

According to a first aspect of the present invention there is provided a mowing machine comprising a mowing element which is mounted for rotation about an upwardly extending axis and which has a cutting member, the machine further comprising a guide member and crop displacing means for conveying cut crop over the guide member, the guide member having a downwardly extending screen portion disposed behind the mowing element with respect to the intended direction of travel of the machine.

According to a second aspect of the present invention there is provided a mowing machine comprising a mowing element which is mounted for rotation about an upwardly extending axis and which has a cutting member, a cover plate being provided above the cutting member, the cutting member projecting forwardly beyond the cover plate, as viewed on plan and with respect to the intended direction of operative travel of the machine, over that portion of its path in which it is operative to cut crop.

According to a third aspect of the present invention there is provided a mowing machine comprising a frame extending transversely of the intended direction of operative travel and supporting a plurality of mowing elements which are mounted for rotation about respective upwardly extending axes and which each have a cutting member, the machine further comprising a guide memeber and a crop displacing member for displacing cut crop over the guide member, the frame being located at least mainly behind the operative regions of the mowing elements, with respect to the intended direction of operative travel, and accommodating the crop displacing member which is mounted for movement around an upwardly extending axis.

According to a fourth aspect of the present invention there is provided a mowing machine comprising a plurality of mowing elements which are mounted for rotation about upwardly extending axes and which each have a cutting member, supporting members being provided beneath the mowing elements for supporting the machine on the ground, a portion of the periphery of each supporting element, as viewed on plan, being straight and extending in the intended direction of operative travel of the machine, or approximately in that direction.

For a better understanding of the present invention and to show how it may be carried into effect, reference will now be made, by way of example only, to the accompanying drawings, in which:

BRIEF DESCRIPTION OF THE DRAWINGS

FIG. 6 is a plan view of a third embodiment of mowing machine.

DESCRIPTION OF THE PREFERRED EMBODIMENTS

Figure 1:
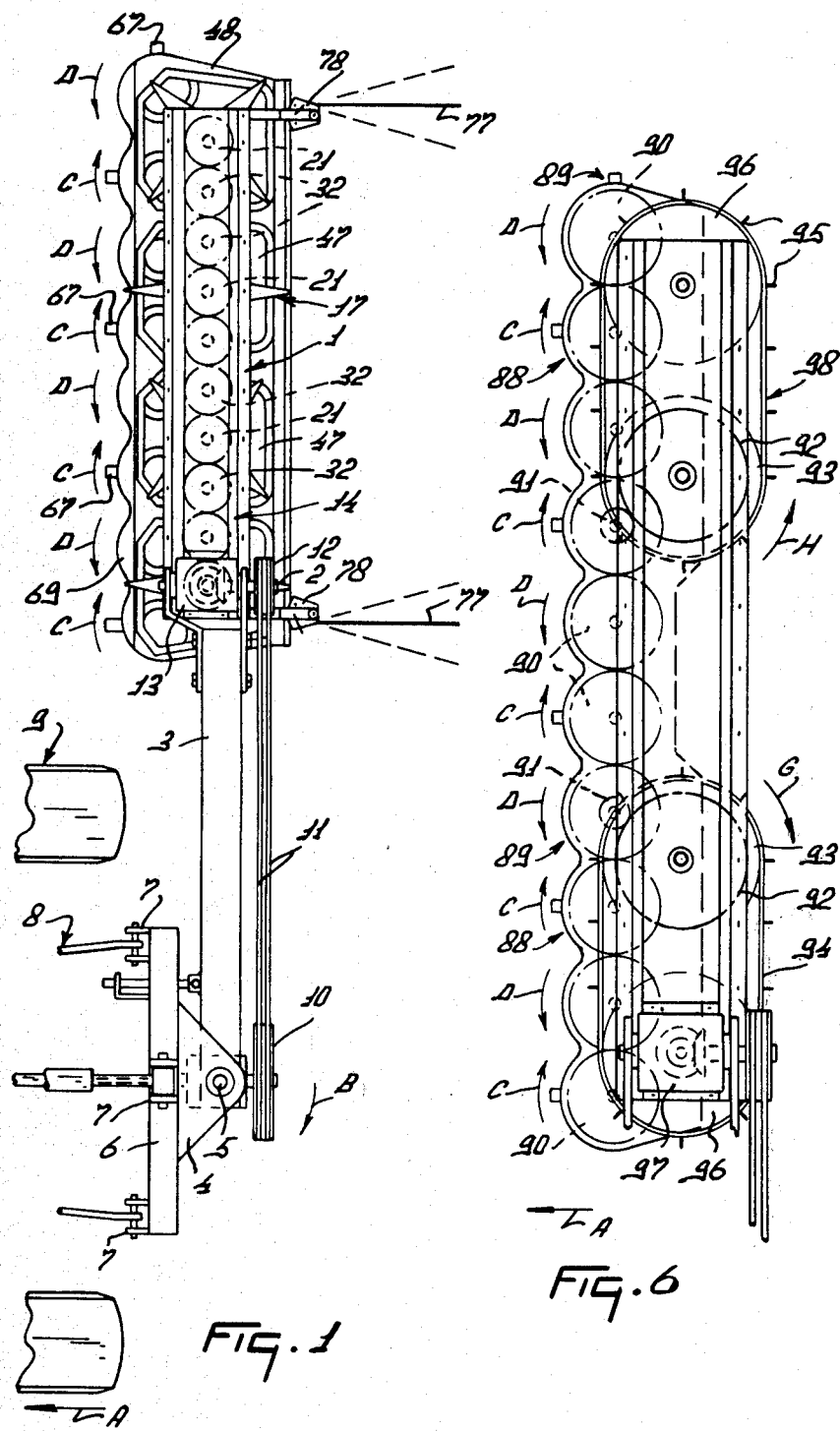
FIG. 1 is a plan view of a mowing machine attached to a tractor.

The mowing machine shown in FIG. 1 comprises a frame 1, which is connected by a horizontal pivotal shaft 2 extending in the intended direction of operative travel of the machine, which is indicated by an arrow A, with an intermediate frame 3 for limited pivotal movement. The end of the intermediate frame 3 away from the frame 1 is positioned between two substantially parallel supporting plates 4, to which it is secured by means of an upwardly extending pivotal shaft 5 allowing pivotal movement of the mowing machine rearwardly through about 90° in the direction of arrow B from the working position shown into a transport position. The supporting plates 4 are fastened to the rear of a substantially triangular trestle 6 which is provided with coupling points 7 for attaching the mowing machine to the three-point lifting device 8 of a tractor 9. The mowing machine is driven in a manner not shown from the power take-off shaft of the tractor 9, which is coupled by an auxiliary shaft with pulleys 10 located behind the pivotal shaft 5. Over the pulleys 10 pass a plurality of V-belts 11, which also pass over pulleys 12 which are rotatable about the axis of the pivotal shaft 2. The pulleys 12 are drivably connected with a bevel gear transmission in a gear box 13, which is rigidly secured to the top of the frame 1.

Figure 3:
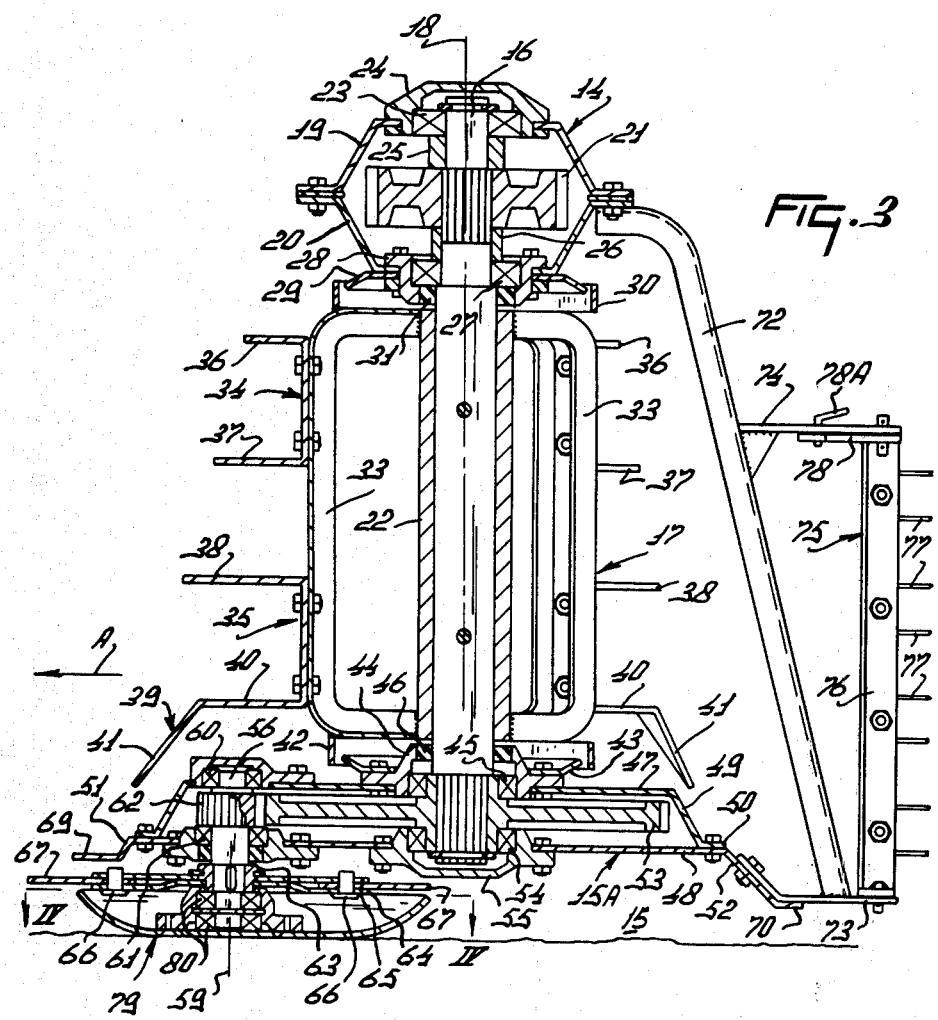
FIG. 3 is a sectional view taken on the line III—III in FIG. 2.
Figure 4:
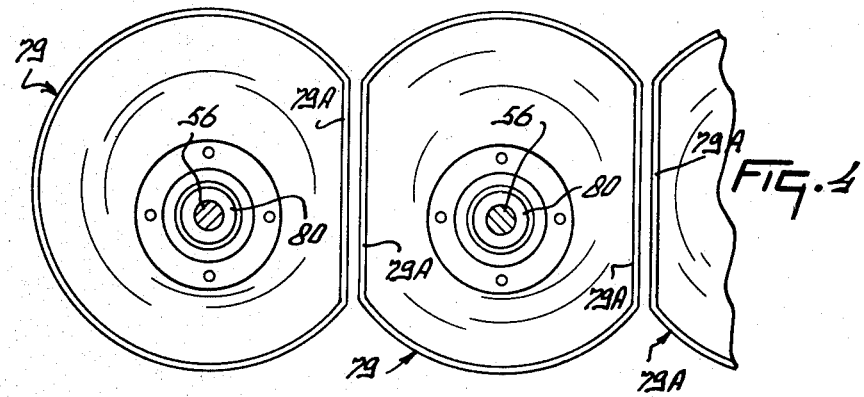
FIG. 4 is a sectional view taken on the line IV—IV in FIG. 3.

As is shown in FIG. 3, the frame 1 comprises two frame portions 14 and 15 which are disposed one above the other and are interconnected by a plurality (in this embodiment four) of upwardly extending shafts 16, each of which carries crop displacing means in the form of a rotor 17, the rotary axis 18 of which coincides with the center line of the shaft 16.

The frame portion 14 comprises a top plate 19 and a bottom plate 20 and serves as a gear box or housing. The plates 19 and 20 are bolted together at the front and at the rear. The frame portion 14 accommodates a plurality of spur pinions 21 arranged on the respective shafts 16 which extend downwards from the top of the plate 19 and fit closely in a tubular sleeve 22. They are journalled at the bottom of the frame 1 in the frame portion 15. Each shaft 16 is held in place with respect to the plate 19 by a ball bearing 23, which is held in the plate 19 by a cap 24. The cap 24 covers the top of the gear box. Between the bearing 23 and the pinion 21 there is a spacer sleeve 25 and there is also a spacer sleeve 26 beneath the pinion 21, which holds the pinion 21 away from a bearing 27. The bearing 27 is fixed to the plate 20 by an annular housing 28, and the connection between the two serves to secure a sealing ring 29, which, together with a substantially cylindrical ring 30 on the top of the rotor, prevents dirt from penetrating radially inwardly towards the shaft 16. Beneath the bearing 27 there is an oil arrester 31. Between the pinions 21 of adjacent rotors 17 there are two intermediate pinions which are also disposed in the frame portion 14; the rotary axes of these intermediate pinions 32 lie in a plane containing the rotary axis 18. The pinions 21 and 32 are, in this embodiment, of identical structure.

The sleeve 22 extends downwards from the housing 28, as is shown in FIG. 3, and carries a plurality of channel sections 33; in this embodiment there are four of these sections 33. Each section 33 has a web portion which extends substantially tangentially to the rotary axes 18 and is substantially parallel to the rotary axis 18. The sections 33 have approximately the same height as the sleeve 22. The sections 33 constitute carriers of the rotor 17 for a plurality of crop displacing elements 34 and 35 disposed one above the other, each of which comprises, in this embodiment, two tines made from spring steel sheet material, each member, including its tines, being made integrally from a single length of material. The member 34 has an upper tine 36 and a lower tine 37, which extend radially outwardly with respect to the rotary axis 18 to the outside and are substantially perpendicular to the rotary axis 18. The free ends of the tines 36 and 37 have pointed tips. The member 35 also comprises two lines 38 and 39. The tine 38 is radial and substantially perpendicular to the rotary axis 18; its end also has a pointed tip. The lower tine 39 has a portion 40 which is perpendicular to the rotary axis and a portion 41 which joins the portion 40 and extends downwards from it. The portion 41 extends downwardly, as shown in FIG. 3, as fas as a plane going through the top of the frame portion 15 and also terminates in a pointed tip. The portions 40 and 41 are preferably at an obtuse angle of about 125° to each other.

Figure 2:
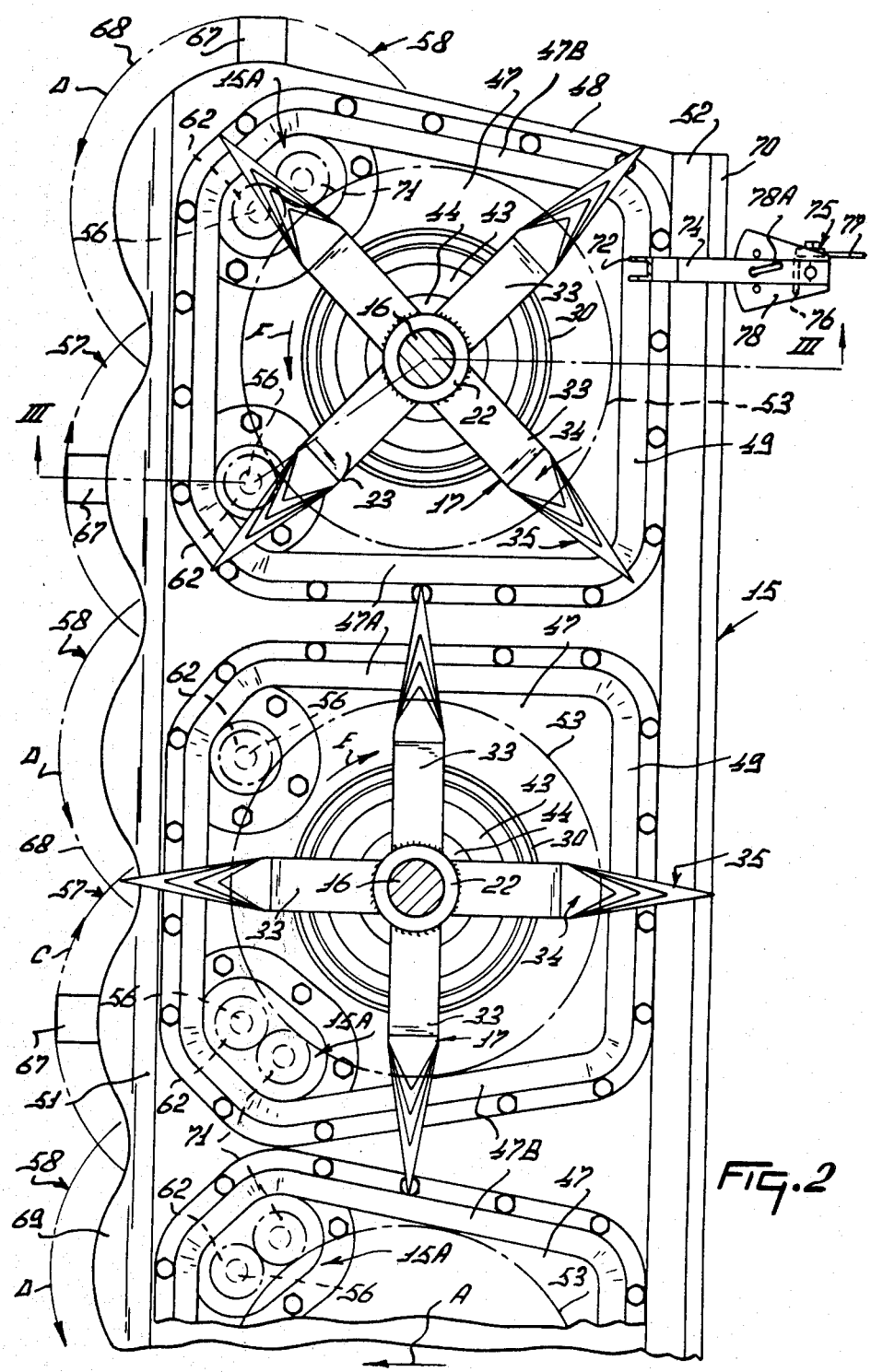
FIG. 2 is an enlarged plan view of part of the mowing machine of FIG. 1.

To the bottom of the section 33 is connected a sealing ring 42 which cooperates with a ring 43 rigidly secured to the frame portion 15. The ring 43 is fastened to a bearing housing 44 which accommodates a bearing 45 and supports an oil arrester 46 which is disposed above the bearing 45. The housing 44 is fastened to the top of an upper plate 47 of the frame portion 15, which, with a bottom plate 48 of the frame portion 15, provides a gear housing or casing 15A. The top plate 47 has a central portion adjacent the housing 44 which extends substantially horizontally and is perpendicular to the rotary axis 18. At the edge of the central portion the plate 47 has a downwardly inclined rim 49 and a horizontal part 50 at the periphery of the rim. The shape of the plates 19, 20, 47 and 48 is preferably obtained by pressing. Viewed on plan (FIG. 2), there is a separate top plate 47 arranged beneath each rotor 17, whereas a single bottom plate 48 covers the whole width of the machine. The top plate 47 preferably has one side rim 47A extending in the direction A and another side rim 47B which is inclined to the direction A, the inclined side rims of adjacent rotors 17 diverging rearwardly from the front of the machine, Each inclined side is preferably at an angle of about 10° to the direction A. The front and rear edges of the top plate 47 extend approximately transversely of the direction A and merge into the side rims at rounded corners. The main part of the lower plate 48 facing the top plate 47 also extends horizontally and is perpendicular to the rotary axis 18. This main part meets, at the front, a downwardly and forwardly inclined portion 51 and, at the rear, a downwardly and rearwardly inclined screen portion 52. The inclined rims formed by these downwardly extending portions 51 and 52 constitute the boundaries of the front and rear sides respectively of the gear box 15A formed by the frame portion 15, in which there is, for each rotor 17, a spur pinion 53. The pinion 53 is journalled at the top in the bearing 45 and at the bottom in a bearing 54 which is secured to the lower side of the plate 48 by a cap 55. A retaining ring supports the shaft 16 axially on the frame portion 15. The gear housing 15A has, some distance in front of the shaft 16, mowing elements 57 and 58.

Only the construction of the mowing element 57 will be described in detail, since it is identical to that of the mowing element 58. The shafts 56 of the two mowing elements are disposed so that, as viewed on plan (FIG. 2), the line of connection between their rotary axes 59 extends transversely of the direction A and the bisector of the angle subtended by the axes 59 at the rotary axis 18 (which angle is preferably about 70°) extends in the direction A. The shaft 56 is supported by bearings 60 and 61 in a similar way to the mounting of the shaft 16 on the plates 47 and 48. With respect to the direction A, the shaft 56 of the mowing element 57 is located at the front corner bounded by the side rim 47A, and the mowing element 58 is located at the other front corner. Between the bearings 60 and 61 there is a spur pinion 62 which meshes within the mowing element 57 with the pinion 53. Beneath the lower plate 48 the shaft 56 is keyed to a hub 63 having two discs 64 and 65. Th two discs are rigidly secured to one another near the hub 63 for some distance, but near the circumference they are spaced apart. The disc 65 is preferably made from spring steel sheet. Diametrically opposite each other with respect to the rotary axis 59, there are two stub shafts 66 which pass through the discs 64 and 65 and are rigidly secured to the disc 64. They extend substantially parallel to the rotary axis 59. The stub shafts 66 constitute pivotal shafts for cutting members 67 which are located between the plates 64 and 65 and each comprise a blade having, as viewed on plan, a substantially rectangular shape with a substantially radially extending cutting edge. The blades 67 extend substantially horizontally and the circle 68 going through their ends (which circle has a diameter of preferably about twenty-eight centimeters) is substantially contiguous with the projection of the shaft 16. The front arc of said circle, which, between the points of intersection with the adjacent arcs, subtends an angle of about 90° at the axis 59. This front arc extends beyond the lower plate 48. Covering the knives 67 there is, on the lower plate 48, a horizontal cover plate 69 which extends from the downwardly extending portion 61 and has a wavy shape, as viewed on plan. The rearmost parts of the waves are located just behind the points of intersection of adjacent circular paths 68. Thus each blade 67 is completely covered by the lower plate 48 over its entire circular path 68 with the exception of the operative portion of the path. The downwardly extending portion 52 of the lower plate 48 covers the paths of the blades at the rear of the machine, this portion 52 extending below the plane of the blades 67. The rear of the plate 48 has a horizontal portion 70, which is straight and extends over the whole width of the machine, as viewed on plan.

The pinion 62 of the mowing element 58 meshes with the pinion 53 through an intermediate pinion 71, this intermediate pinion 71 being arranged on a shaft which is journalled, like the shaft 56, in the lower and upper plates 47 and 48. The pinion 71 is disposed, as viewed from a side, with its rotary axis located between those of the shafts 56 and 16. In this way the mowing element 57 can be driven in the direction indicated by an arrow C which is in the opposite direction to the rotation of the mowing member 58 which is indicated by an arrow D in FIG. 2. In order to ensure satisfactory co-operation of the mowing elements 57 and 58, the blades 57 of the mowing elements are off-set relatively to one another by an angle of about 90°.

The tines 36 to 39 have different lengths, each tine being longer than the one above it, if there is one. The free end of the tine 39 describes a circular path which, at the front goes very close to the point of intersection of the circular paths 68. The circular path of the free end of the tine 39, at the rear, goes very close to the horizontal portion 70, as viewed on plan.

The crop displacing members 34 and 35 of adjacent rotors 17 are off-set from one another by about 45° and the paths described by the free ends of the tines 39 of adjacent rotors 17 overlap by 25 to 30% of the radius of these paths.

To each of the two lateral ends of the frame portion 41 is secured a carrier 72, which extends rearwardly, as viewed on plan, with respect to the direction A and which is bent downwardly as can be seen in the side elevation of FIG. 3. The lower end of the carrier 72 is located at a short distance behind and slightly above the horizontal portion 70 and is supported on the lower plate 48 by a support strip 73, which extends behind the carrier 72. About two thirds of the way up the carrier 72 from the bottom there is a support 74 which extends, like the support 73, towards the rear and is substantially horizontal. Near the rear ends of the supports 73 and 74 there are bores for receiving aligned stub shafts of a swath forming member. The swath forming member comprises an angle iron 76, to which are fastened four pairs of spring steel tines 77, which extend rearwardly from the angle iron 76 and are substantially horizontal. In the position shown in FIG. 2, they are parallel to the direction A. The position of the swath forming member 75 can be adjusted by a tag 78 and a pin 78A with respect to the rest of the mowing machine and can be set in any one of a plurality of positions; in this embodiment, there are three possible positions.

The mowing machine is supported on the ground by supporting members 79, each of which is freely rotatable in two bearings 80 mounted on the shaft 56 beneath the blades 67. In this way each mowing member 57 and 58 has arranged beneath it a respective supporting member or dish 79. The supporting member is convex and has a substantially horizontal, flat central portion. The supporting member is fastened eccentrically to the shaft 56 in front of its center, with respect to the direction A, and, as shown in the sectional view of FIG. 3, the rear edge lies beneath the free end of the blade 67 and the front edge lies just beyond the stub shaft 66. As viewed on plan, the adjacent side edges 79A of the members 79 are straight for some distance and extend substantially in the direction A; there is a gap between these side edges 79A to allow a small turn of each supporting dish 79, the adjacent supporting dish 79 then serving as a stop.

The mowing machine shown in FIGS. 1 to 4 operates as follows.

During operation the mowing machine is attached to the tractor 9 and is driven through the gear box 13, which rotates the pinions 21 and 32 arranged in a row. The pinions 21, in turn, drive their respective shafts 16 which cause the rotors 17 to revolve in opposite directions as indicated by arrows E and F respectively. The rotors have a speed of 500 to 1600 rev/min. The mowing elements 57 and 58 are driven by the large pinions 53 located beneath the rotor 17 and, depending on the choice of the pinions 53 and 62, each mowing element may have a speed of rotation which is five to eight times the speed of rotation of the rotor. Thus each blade 67 has a very high rotational speed and hence a very high cutting speed. This high speed of the blades 57 results in the crop maintaining its original upright position during cutting so that the cutting effect is very accurate and double cutting is minimized. The cut crop is conducted to the rear of the machine by the crop guiding element afforded by the top of the front part of the lower plate 48 and by the whole plate 47, the crop being engaged almost immediately after cutting by the tines 36 to 39 of the rotor 17 to be conducted away along the crop guiding element. Subsequently, depending on the setting of the swath forming members 75, the crop is tedded and then spread in a fan-like fasion behind the machine or else is deposited in a defined swath. The supporting members 79 cause the mowing machine to follow the unevenesses of the ground smoothly, and, owing to the edges 79A the, supporting members 79 can oscillate to a limited extent. The design of the lower plate 48 ensures a safe construction despite the high speed of the blades 67, since objects thrown up by the rotating mowing elements ae captured at the rear by the downwardly extending portion 52 and directed to the ground. Since the blades 67 are made from very thin material (they are preferably about two millimeters thick), they will not be a risk to persons during the mowing operation, since their mass is small and the resistance in air is high. Moreover, it is a great advantage that, as viewed on plan, the blades are projecting beyond the lower plate only in the working range so that they are covered satisfactorily on top.

In the embodiment shown in FIGS. 1 to 4, the eight mowing elements 57 and 58 have an overall working width of about 1.65 meters.

Figure 5:
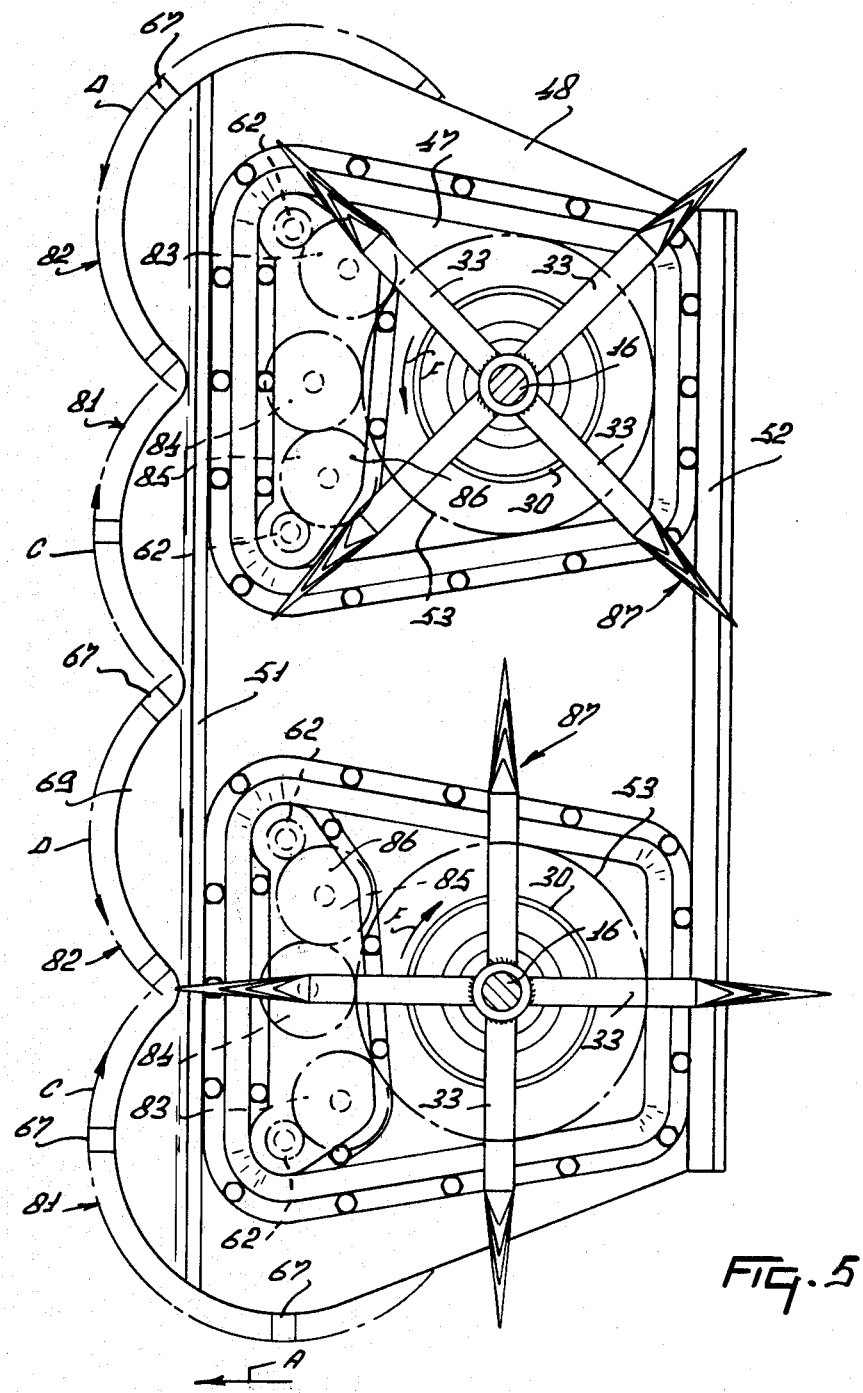
FIG. 5 is a plan view of part of a second embodiment of mowing machine.

In the alternative embodiment shown in FIG. 5 this working width is obtained by only four mowing elements 81 and 82, which are substantially identical to the mowing elements 57 and 58 of the first embodiment, their diameter being however, about fifty centimeters. The mowing elements 81 and 82 are driven from the tractor in the same manner, but between the pinions 53 and 62 there is either one pinion 83 or two pinions 84 and 85. The pinions 83, 84 and 85 as well as the pinions 62 are covered on top by a single cover 86. In view of the larger diameter of the mowing elements 81 and 82 a rotor 87 is arranged above each pair of mowing members, the diameter of this rotor being about half the working width of the machine. The two rotors 87 can be driven in opposite senses indicated by arrows E and F respectively and are constructed like the rotors 17 of the first embodiment, apart from their larger diameter. The embodiment shown in FIG. 5 has the advantage that only four moving elements are provided and so its construction may be comparatively simpler. The comparatively large rotors 87 provide, in addition, a very prompt delivery of the crop, which may be directly deposited in a swath.

FIG. 6 shows schematically a mowing machine comprising ten mowing elements 88 and 89 with adjacent ones rotating in opposite sense, driven each by pinions 90. Adjacent pinions 90 are directly in mesh with one another and the fourth pinion 90 out from the tractor is arranged on a shaft, which is provided with a comparatively small pinion 91 located above the pinion 90. The pinion 91 meshes with a comparatively large pinion 92 arranged on a shaft which is provided above the pinion 92 with a cylindrical roller 93, about which an endless element or rotor 94 is guided. This element 94 constitutes a conveyor belt having, at its periphery, crop displacing members in the form of tines 95. The endless element 94 passes over a cylindrical roller 96. The element 94 has, therefore, two rotary shafts, and as viewed on plan, it covers the rear part of four mowing members 88 and 89 respectively. The endless element moves over the rollers 93 and 96 and between them it is approximately perpendicular to the direction A. It rotates over the roller 93 in the direction of the arrow G. The roller 96 is driven in the manner described for the first embodiment by means of a gear box 97 similar to the gear box 13. From the tractor, via the roller 96 are driven the element 94, the roller 93 and the pinion 92 which, in turn, drives the pinion 90 of the mowing elements. In symmetry to the element 94 is arranged an element 98, which is driven in the same manner through a pinion 91 on the shaft of one of the mowing elements in the direction of the arrow H which is opposite the arrow G. The mowing machine in this third embodiment has a very effective delivery of the crop, which is raked into a swath. Owing to the disposition of the elements 94 and 98, the crop is conducted away directly after cutting so that, particularly in cutting comparatively heavy crop, problems of jamming or damage of the crop or both are minimised.

Although various features of the machine described and illustrated in the drawings, will be set forth in the following claims as inventive features, it is to be understood that the invention is not necessarily limited to these features and may encompass all of the features that have been disclosed both individually and in various combinations.

Having described my invention, what I claim as new and desire to secure by Letters Patent of the United States:

1. A mowing machine comprising a frame extending transversely to the intended operational direction of travel of the machine and a row of mowing elements having shafts mounted for rotation about upwardly extending axes in said frame, said frame having a first frame part extending over said row of mowing elements, at least two rotors situated underneath said first frame part but at a higher level than said mowing elements, said rotors rotating about upwardly extending axes, said first frame part comprising first drive means extending from one of said rotors to another one of said rotors, a second drive means arranged at a lower level than said rotors arranged to drive a plurality of said mowing elements which have their rotary axes spaced a distance from said axes of said rotors, a second frame part interconnecting said shafts on said mowing elements which is arranged at a lower level than said rotors, the axes of said rotors and said mowing element having a fixed relationship.

2. A mowing machine as claimed in claim 1, wherein said second drive means comprises gears.

3. A mowing machine as claimed in claim 1, in which said second frame part has its forward edge continually forward of the axes of rotation of said mowing elements and comprises a series of curved projections as seen in plan.

4. A mowing machine comprising a frame having a first frame beam extending transversely to the intended operational direction of travel of the machine and a row of mowing elements having shafts mounted in said first frame beam for rotation about upwardly extending axes, said frame having a second frame beam extending over said row of mowing elements, at least two rotors being provided in said frame underneath the ends of said second frame beam but higher than said mowing elements, said rotors rotating about upwardly extending axes, at least one driving shaft being mounted on said first frame beam and being coupled with driving means mounted to said first frame beam for rotating at least part of said mowing elements, said driving shaft having an axis of rotation which is coaxial with the axis of rotation of at least one of said rotors, said second frame beam extending transverse to the machine's intended direction of operational travel and having its axis in a vertical plane also containing the axis of rotation of said driving shaft, said second frame beam having at its outer end a vertical support extending coaxially with the axis of rotation of the outermost said rotor, said latter axis also being contained in said plane, said axes of said mowing elements and said axes of said driving shafts having constant relative positions.

5. A mowing machine comprising a frame extending transversely to the intended operational direction of travel of the machine and a row of mowing elements having shafts mounted for rotation about upwardly extending axes in said frame, said frame having a first frame part and a second frame part, said first frame part extending over said row of elements, at least two rotors situated under said first frame part and over said mowing elements, said rotors rotating about upwardly extending axes, said first frame part comprising a drive means extending from one of said rotors to another one of said rotors, a further drive means arranged under said rotors to drive said mowing elements, said further drive means extending between a rotor and only a part of said row of mowing elements whereby the axes of rotation of said part of the row of mowing elements are spaced at a distance from the axes of rotation of said rotors, said second frame part interconnecting said shafts of said mowing elements and being arranged under said rotors, said further drive means being arranged in said second part.

6. A mowing machine as claimed in claim 5, wherein said first frame part has its front edge continually forward of said axes of rotation of said mowing elements and comprises a series of curved projections as seen in plan.

* * * * *